Aug. 4, 1959 — L. E. LEE — 2,897,790
FLUID CONTROL SYSTEM FOR MACHINE TOOLS
Filed March 29, 1957 — 5 Sheets-Sheet 1

INVENTOR
LUTHER E. LEE
BY
ATTORNEYS

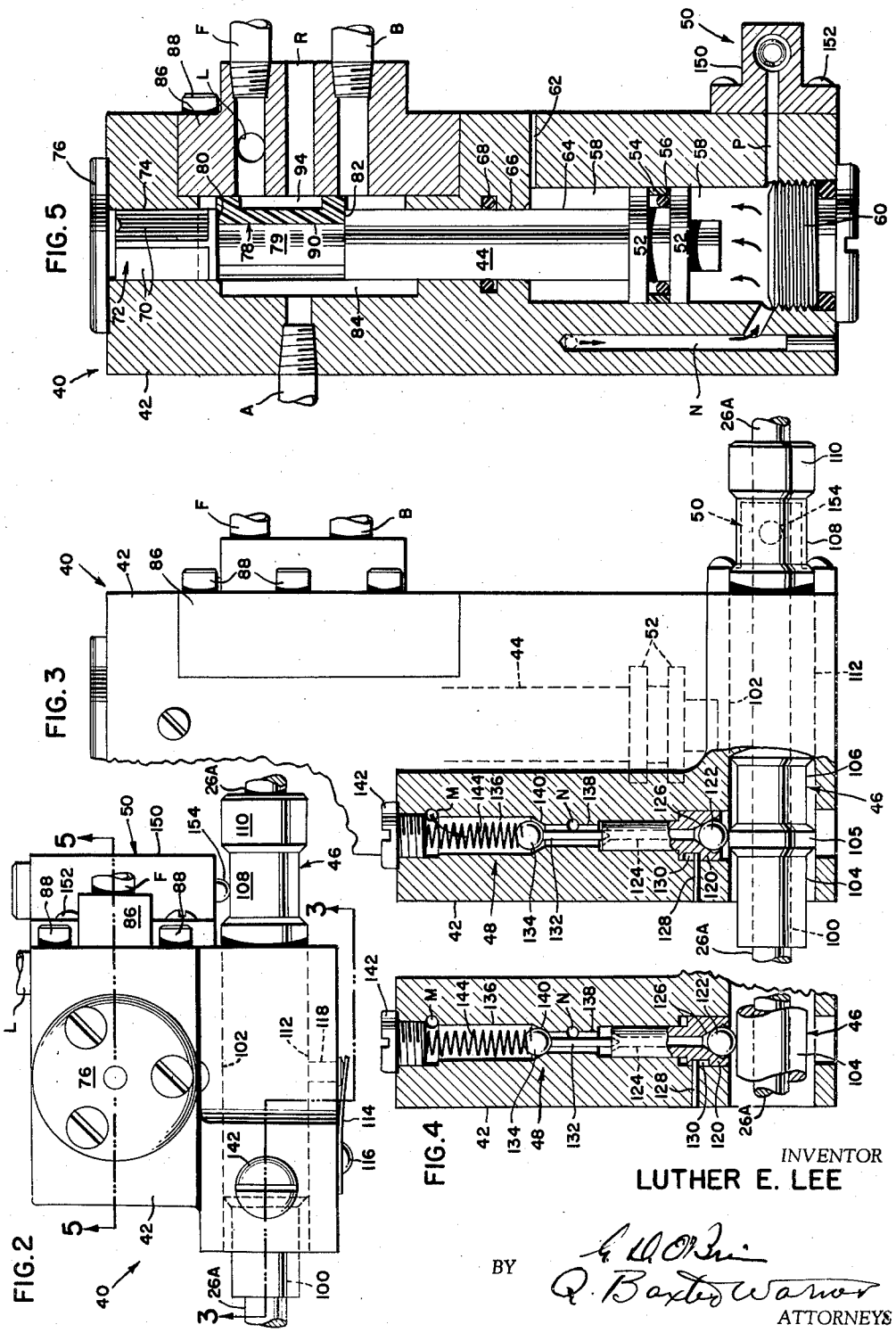

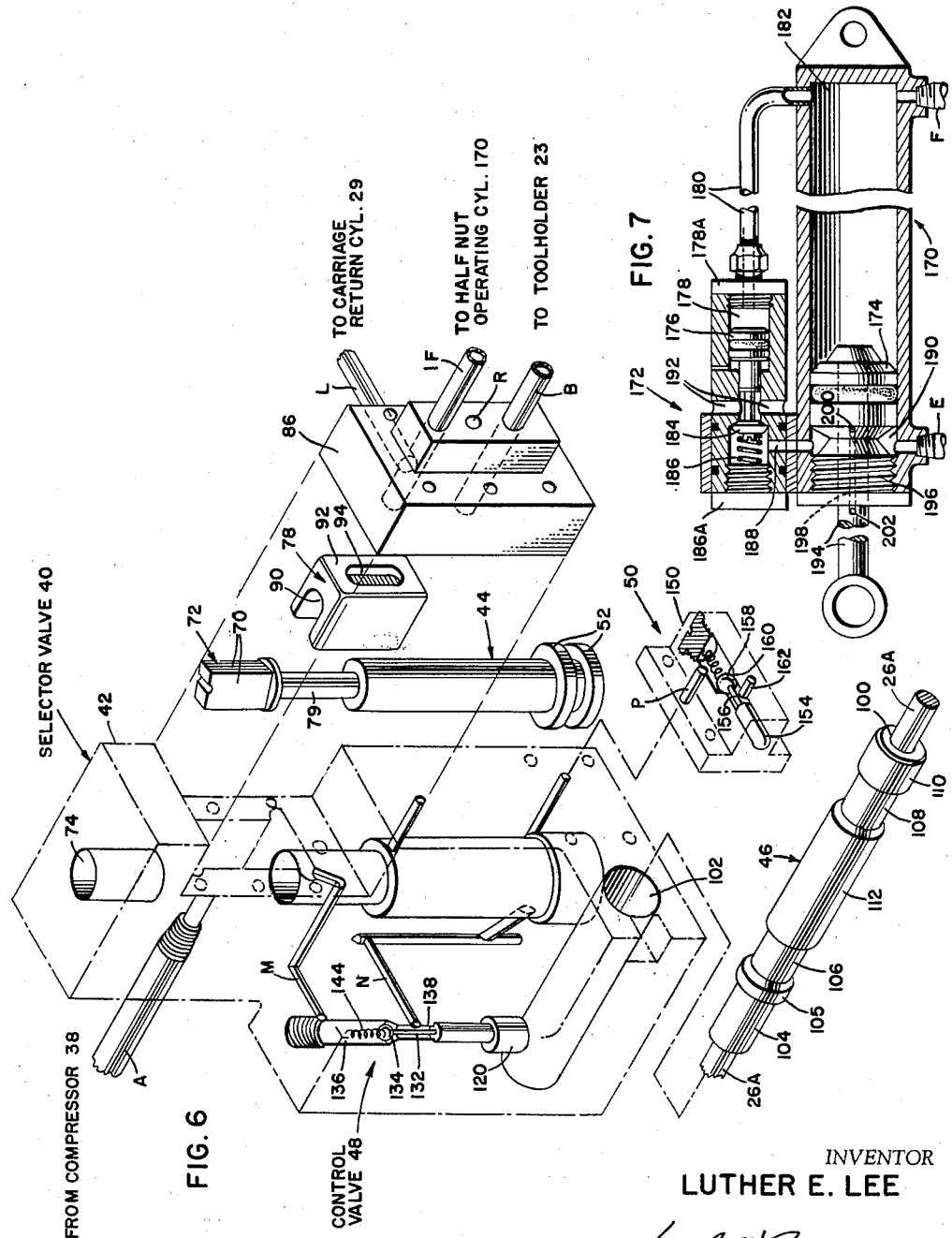

Aug. 4, 1959  L. E. LEE  2,897,790
FLUID CONTROL SYSTEM FOR MACHINE TOOLS
Filed March 29, 1957  5 Sheets-Sheet 4
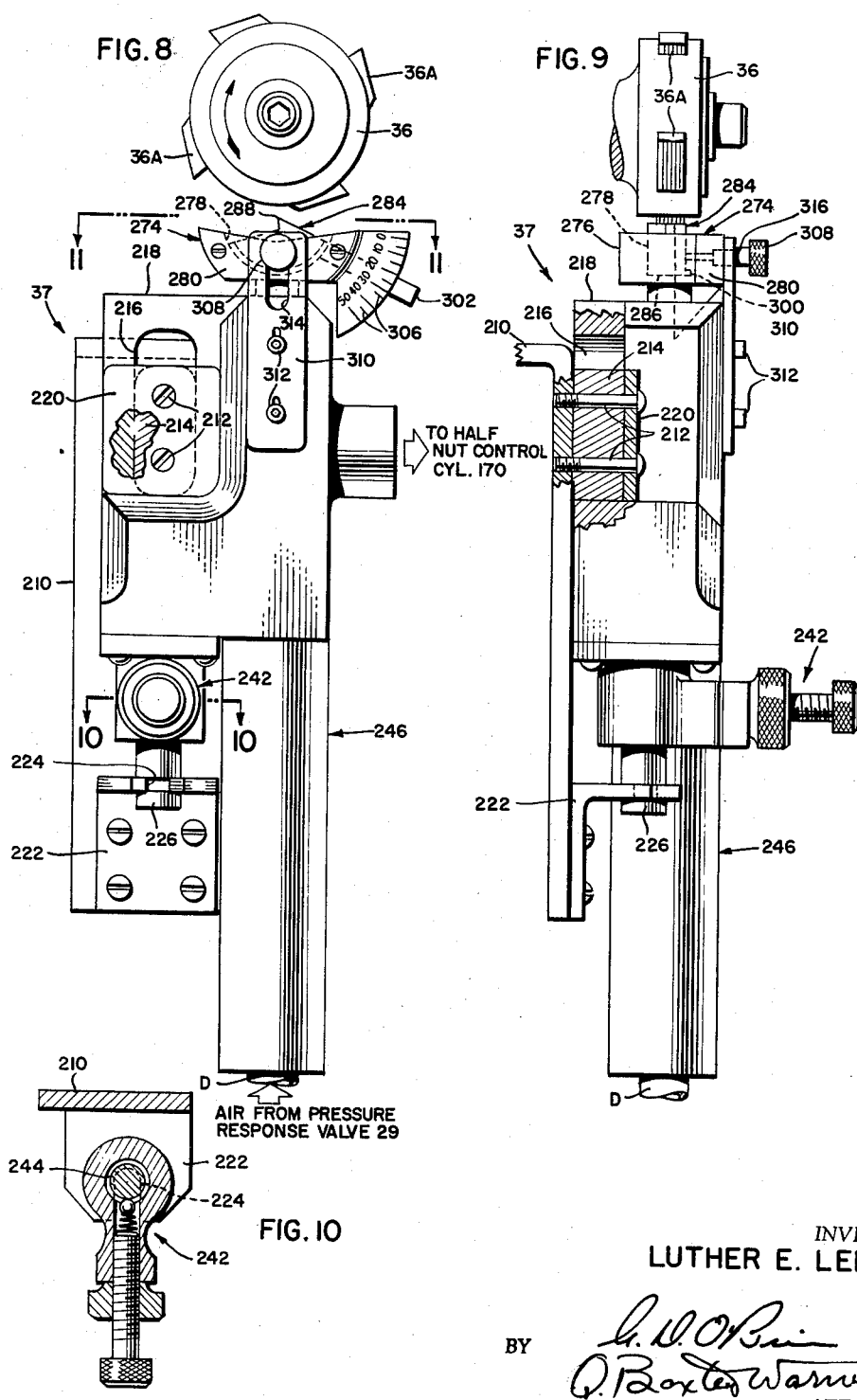
INVENTOR
LUTHER E. LEE
BY
ATTORNEYS

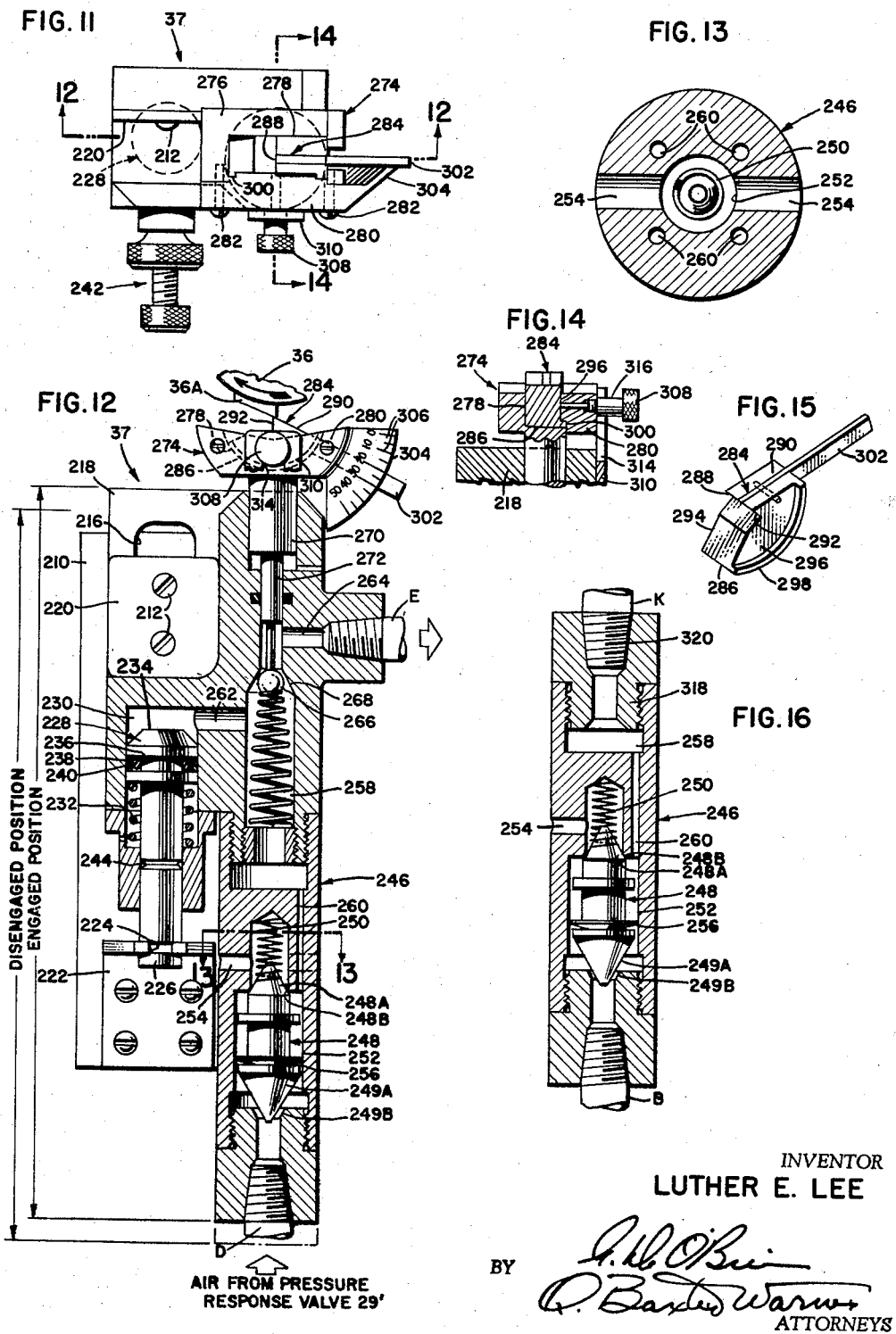

United States Patent Office 2,897,790
Patented Aug. 4, 1959

2,897,790

FLUID CONTROL SYSTEM FOR MACHINE TOOLS

Luther E. Lee, Takoma Park, Md.

Application March 29, 1957, Serial No. 649,580

7 Claims. (Cl. 121—45)

(Granted under Title 35, U.S. Code (1952), sec. 266)

The invention described herein may be manufactured and used by or for the Government of the United States of America for governmental purposes without the payment of any royalties thereon or therefor.

The instant invention is a continuation-in-part of application Serial No. 482,682, now U.S. Patent No. 2,854,822, filed by Luther E. Lee on January 18, 1955 for Pneumohydraulic-Electric System.

The present invention relates to a pneumatic control system for machine tools and more particularly to such a system for effecting the automatic operation of a machine tool, such as a lathe, for turning and thread chasing operations.

The present invention provides a system which controls the movement of an automatically advanced cutting tool into and out of a workpiece at specific timed intervals. Furthermore, the present invention controls the longitudinal movement of the cutting tool along the workpiece and, upon the completion of a forward cutting stroke, returns the tool to its initial position at which time the tool automatically advances to another cutting increment before being moved into the workpiece for the next cutting cycle.

An object of the present invention is to provide a pneumatic system capable of controlling automatically the multistage operations of a lather during turning and thread cutting operations.

Another object of this invention resides in the provision of a novel valve system for selectively controlling fluid pressure in a system, the valve being capable of instantaneous response during high speed, automatic lathe operations.

A further object of this invention is to provide a novel valve actuating means wherein extremely small movements of terminal carriage travel in forward and return movements result in a rapid response of the remainder of the system.

Another object of the present invention is to provide a novel valve operable by differential pressures from a single pressure source and capable of quick response to small increments of terminal carriage travel in one and the opposite directions.

Still another object is the provision of a valve means selectively engageable with a rotating thread counter dial for initiating a series of operations responsive to a predetermined pressure exerted on the feed of the cutting tool.

A further object of the invention is the provision of an adjustable cam means for engaging a rotating thread counter dial in variable degrees of timed relationship in accordance with selected speeds of lathe operations.

Still another object of the present invention resides in the provision of means for rapidly venting the residual pressures remaining in the various elements of the system at the completion of the forward and reverse terminal movements of the carriage.

Other objects and many of the attendant advantages of this invention will be readily appreciated as the same becomes better understood by reference to the following detailed description when considered in connection with the accompanying drawings wherein:

Fig. 2 is a top plan view of the novel selector valve employed in the system of the present invention;

Fig. 3 is a side elevational view with parts broken away along a line substantially corresponding to line 3—3 in Fig. 2;

Fig. 4 is a fragmentary vertical sectional view of a portion of the valve illustrated in Fig. 3 with valve parts moved to show changed relationship;

Fig. 5 is a longitudinal sectional view of the selector valve taken along a line substantially corresponding to line 5—5 in Fig. 2;

Fig. 6 is an exploded view of the selector valve, the valve body being shown in dashed lines to facilitate comprehension of the arrangement of the valve elements and the internal passages;

Fig. 7 is a longitudinal sectional view of the novel half-nut lever operating cylinder and fast air relief valve associated therewith;

Fig. 8 is a side elevational view of the novel thread dial indicator and thread dial indicator valve in the up or engaged position;

Fig. 9 is an end elevation of the dial and valve illustrated in Fig. 8, parts being broken away to show internal structure;

Fig. 10 is a sectional view of a portion of the thread dial indicator valve as viewed from a line substantially corresponding to line 10—10 in Fig. 8;

Fig. 11 is a top plan view of the thread dial indicator valve as viewed from a line substantially corresponding to line 11—11 in Fig. 8;

Fig. 12 is a longitudinal sectional view of the thread dial indicator valve as viewed from a line substantially corresponding to line 12—12 in Fig. 11;

Fig. 13 is a sectional view taken along a line substantially corresponding to line 13—13 in Fig. 12 and illustrating a series of passages not shown in Fig. 12;

Fig. 14 is a fragmentary sectional view of the variable cam taken along a line substantially corresponding to line 14—14 in Fig. 11;

Fig. 15 is a perspective view of the variable cam shown removed from its associated structure; and Fig. 16 is a longitudinal sectional view of the novel fast air dump valve shown as a portion of the thread dial indicator valve in Fig. 12 and modified for use in other parts of the system of the present invention.

Figure 1:
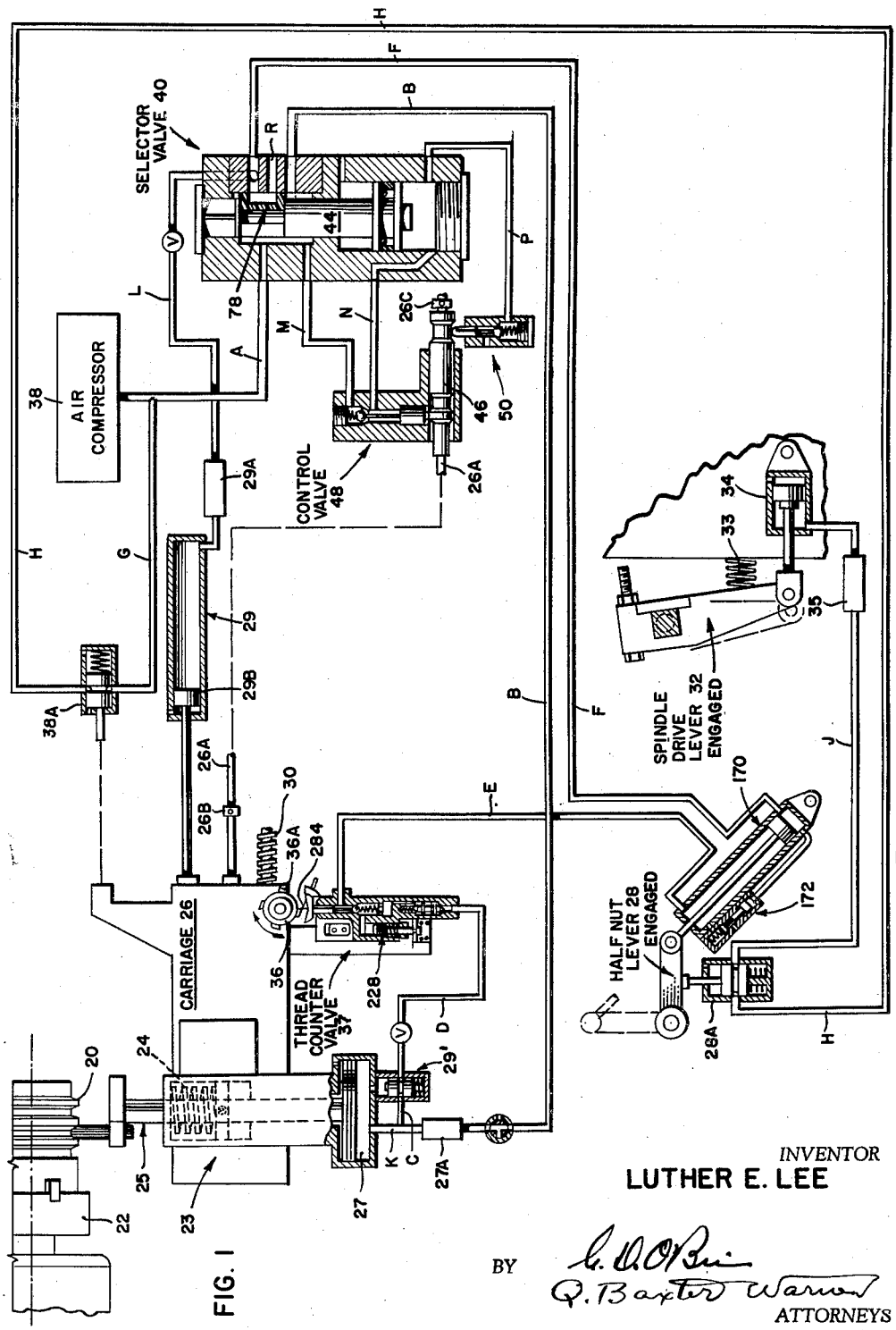
Fig. 1 is a diagrammatic view showing the relative positions of the control elements when the tool carriage is moving in a forward cutting stroke.

Referring to the drawings, and particularly to Fig. 1, the present invention is illustrated as being connected to a conventional engine lathe, parts of which are diagrammatically shown, such as the type employed in turning and thread cutting operations. The lathe mounts a rotatable workpiece 20 supported at one end in a head stock 22, the opposite end being supported in any conventional manner. An automatic, step advancing toolholder 23, such as disclosed in my copending application Serial No. 413,487, filed March 1, 1954 for Machine Tool, is secured to the conventional cross-feed slide (not shown) for preliminary positioning of the toolholder with relation to the workpiece. A carriage 26 supports the toolholder 23 for longitudinal forward and rearward movement along conventional lathe bed ways (not shown), the carriage 26 being driven forwardly during thread cutting operations by engagement of half-nut lever 28 coacting with a lead screw 30. Other conventional lathe elements include a clutch for the spindle drive, operable by spindle drive lever 32, and a thread counter dial 36 which rotates at a speed indicative of the lead screw rotation.

Before proceeding further, the operation of the system, as disclosed in Fig. 1, will be briefly described. An air compressor 38, or any other suitable source of pressurized air, supplies air at pressures of 60 to 100 pounds per square inch via conduit A to a selector valve 40. Depending upon carriage orientation, a horizontally movable cam sleeve 46, actuated only during the final stages of movement of the carriage in either the forward or rearward direction, is utilized to position a control valve 48 in the selector valve 40 to an open or closed position, in which positions, air is either ported to the upper or lower ends of a selector valve piston 44. Positioning of the selector valve piston 44 in the upper position ports pressure fluid to the various elements of the system causing initiation of a work cycle in the forward direction. Upon termination of a work cycle, the carriage repositions the cam sleeve 46 closing control valve 48 and opening release valve 50 thus venting the lower end of the selector valve piston 44 to the atmosphere. Selector valve piston 44 now moves to the down position upon application of pressure fluid to the upper end thereof.

With the selector valve piston 44 in the up position, as shown in Fig. 1, pressure fluid is ported from within the selector valve 40 via conduits B and K to a toolholder driving piston chamber 27 thus urging a toolholding ram 25 into the workpiece. A pressure response valve 29', actuated by a predetermined pressure build-up within the piston chamber 27, now opens and ports pressure fluid from conduit K via conduits C and D to the lower end of a thread dial indicator valve or thread counter valve 37. The pressure is controlled by selector valve 40 in communication with a source of pressure 38 and with chamber 27 by way of conduit B and vent valve 27A disposed therein.

Thread counter dial or thread dial indicator 36 is provided with a series of cam lobes 36A affixed thereto and upon positioning of the thread counter valve 37 in engaged relationship, cam lobes 36A strike a variable cam 284 to open the thread counter valve 37 at precisely timed intervals. In order to synchronize the engagement of the half-nut lever 28 with the arrival of a predetermined lobe 36A in engagement with variable cam 284 during rotation of the thread counter dial 36, the thread counter valve 37 is caused to be moved into an operating or cam engaging position as the pressure in chamber 230 of counter valve 37 reaches a predetermined value, whereupon the aforesaid cam 284 engages one of the cams 36A as the dial 36 rotates. It will be understood that as pressure enters cylinder 252 by way of conduit D pressure is supplied to piston chamber 230 of counter valve 228 by way of valve 248 therein and ports 260 and 262. When the pressure in chamber 230 reaches the predetermined, valve casing 218 is moved to the aforesaid operating position, the casing 218 being mounted for sliding movement on head 234 of piston 228 and a block 214. The head 234 of the piston is disposed within chamber 230 in counter valve 37 with the stem thereof fixed to bracket 222, mounted on the carriage 26, the block 214 being fixed to the carriage and disposed within a slot 216 formed in casing 218, whereupon the casing will be moved from an initial position to an operating position in response to the aforesaid pressure in chamber 230. The casing or body 218 is maintained in an initial position by spring 232 disposed within chamber 230, the spring being adapted to urge the casing from an operating position to an initial position when the pressure in chamber 230 is reduced. Upon engagement of cams 284 and 36A check valve 266 is opened by stem 272 on cam housing 274, whereupon air passes through conduit E to one side of a half-nut lever operating cylinder 170 to operate the half-nut lever 28. At this stage of the cycle, the rotating thread counter dial 36 automatically stops and thread check valve 266 remains open for the remainder of the thread cutting cycle.

Residual air in the opposite end of the operating cylinder 170 is vented by means of conduit F leading back to the selector valve, the residual air passing through slide valve 78 and thence to atmosphere via vent R. With the half-nut lever 28 fully engaged, an indicator valve 28A opens and pressure fluid now is directed from the compressor 38 via conduit G through a carriage overtravel safety valve 38A (normally open) via conduit H to the open indicator valve 28A and thence to the spindle drive operating cylinder 34 via conduit J and check valve 35.

At this stage of a thread cutting cycle, the toolholder has been advanced into the rotating workpiece and the carriage is traveling to the right or, in other words, in a forward direction. Upon termination of the desired carriage travel to the right, the cam sleeve 46 is caused to be moved to the right by means of a forward adjustable striker 26B mounted on a carriage control rod 26A. At this same time, residual air from a carriage return cylinder 29 is vented by means of check valve 29A as a carriage mounted return piston 29B moves to the right in the cylinder. Movement of the cam sleeve 46 causes control valve 48 to be closed thus terminating the flow of pressure air to the lower end of the selector valve piston 44. Pressure via conduit A now is applied to the upper end of the selector valve piston 44 thus forcing the piston downward. Passage of air to the toolholder is now blocked by slide valve 78 and a toolholder return spring 24 now forces the ram 25 away from the workpiece 20. Air from piston chamber 27 is rapidly vented by means of the check valve 27A mounted between conduits K and B adjacent the chamber 27.

The afore-mentioned operations now occur in reverse order: Pressure response valve 29' closes, thread counter valve 37 retracts from engagement with the thread counter dial 36, the dial now resumes rotating; the half-nut lever operating cylinder 170 is reversely operated by pressure fluid via conduit F and is fast vented by means of release valve 172 to disengage the half-nut lever 28, causing its indicator valve 28A to close by spring pressure. A return spring 33 now moves the spindle drive lever 32 to a disengaged position, the spindle drive operating cylinder 34 also being fast vented by means of check valve 35.

Simultaneous with the foregoing operations, incoming pressure air from conduit A is now free to bypass the downwardly moved slide valve 78 and is ported via conduit L to the carriage return cylinder 29 thus moving the carriage rearwardly prior to commencing the next thread cutting cycle. As the carriage moves rearwardly and approaches its initial starting position, a rearward adjustable striker 26C engages the right end of the cam sleeve 46 causing control valve 48 to reseal the lower end of selector valve 40. Pressure fluid now in the selector valve 40 leaves via conduit M, control valve 48 and thence via connecting conduit N to the lower end of the selector valve piston 44 causing upward movement thereof. A new cutting cycle is now resumed as the toolholder 23 automatically advances another cutting increment as previously described.

*Selector valve*

Now referring particularly to Figs. 2 through 6, the selector valve 40 comprises a valve body 42 which houses a vertically reciprocable piston 44, and a horizontally slidable cam sleeve 46 engageable with the control valve 48 and release valve 50. The selector valve piston 44 is formed at the lower end thereof with an enlarged head 52 suitably sealed by compression ring 54 and O-ring 56, as best shown on Fig. 5, the head being reciprocable in chamber 58. The lower end of the chamber 58 is normally sealed from the atmosphere by means of screw plug 60 but is in communication with control valve 48 and release valve 50 by means of conduits N and P respectively. The upper end of chamber 58 is vented at 62 to permit free upward movement of the piston head 52. The selector valve piston 44 above and adjacent the head 52 is of a reduced diameter as at 64 and is slidably supported in the valve body at a portion 66 thereof intermediate its ends. A suitable sealing ring 68 carried by the valve body is utilized to prevent air passage from the chamber 58 to the upper end of the valve body. The upper end of the valve piston 44 is of substantially the same diameter as that of the lower reduced portion and further has a series of flats 70 formed on a portion thereof to produce a squared end 72. The squared end 72 slides in and is supported by an upper chamber 74 formed in the valve body, the chamber receiving pressurized air, dependent upon cam sleeve positioning, to move the valve piston 44 downwardly. The upper chamber is sealed by a cap 76 which also serves to limit upward travel of piston 44. A slide valve 78 is supported on the valve piston by a pair of upper and lower shoulders 80 and 82, respectively, formed by further reducing the piston diameter as at 79 between the upper squared end 72 and the lower reduced portion 64. The slide valve 78 is vertically reciprocable with the piston 44 and moves in a central chamber 84 enlarged sufficiently to allow air passage around the piston and areas adjacent the slide valve.

Turning now to a consideration of Fig. 6, the valve body 42 is illustrated as being cut away at one side thereof to receive a slide valve block 86, the block being bored to form a series of air passages for carriage return conduit L, toolholder conduit B, carriage feed operating cylinder reverse conduit F and a vent R common to the foregoing. The block is secured in any suitable manner and is illustrated as being secured by a series of bolts 88 to the valve body 42. The interior face of the block 86 communicates with the enlarged central chamber 84 and also forms a pressure tight seal against one face of the slide valve 78. The slide valve is shown in Fig. 6 to be substantially rectangular in configuration with a U-shaped slot 90 formed along the longitudinal axis thereof. The slot 90 engages the reduced portion 79 of piston 44 while the upper and lower ends of the valve are retained by the upper and lower shoulders 80 and 82 respectively. One face 92 of the slide valve 78 is partially cut away to form a communicating passage 94 between the vent R and either the paired conduits F and L or the conduit B.

Referring to Fig. 5, the piston 44 is shown as being almost at its uppermost limit of travel, the slide valve 78 being positioned to allow vented air from the half-nut operating cylinder conduit F to pass via slide valve passage 94 and thus to vent R to atmosphere. Air compressor conduit A enters the valve body 42 from the side opposite that of the slide valve 78 and communicates with central chamber 84. With the slide valve 78 in the position shown, air under pressure enters chamber 84, passes about the piston 44 and is ported to the toolholder 23 via conduits B and K.

Referring now to Figs. 2, 3, 4, and 6, the cylindrical cam sleeve 46 has a central bore 100 throughout its entire length to accommodate the carriage control rod 26A, slidable therethrough. The cam sleeve 46 is slidably guided in an offset, horizontally bored cylinder 102 formed integral with the valve body 42, the offset positioning allowing sleeve movement adjacent to and at right angles to movements of the selector valve piston 44. The cam sleeve 46 is shown as being reduced in diameter adjacent one end at 104 and 106 to form therebetween a raised annular cam 105 which actuates the control valve 48. The opposite end of the cam sleeve 46 also has a reduced portion 108 to form another annular cam 110 at the extreme end thereof which actuates the release valve 50. The intermediate portion 112 of the cam sleeve between the two aforementioned cams is of uniform diameter to slidably fit its mating cylinder 100 in the valve body 42. As best shown in Fig. 2, the sleeve 46 is prevented from excessive longitudinal movement by means of a leaf spring 114 secured at 116 to the valve body, the free end bearing against a pin 118 frictionally engaging the intermediate portions 112 of the sleeve 46.

Details of the control valve 48 are best illustrated in Figs. 3, 4 and 6 wherein it will be observed that the lower end of the control valve 48 consists of a stem 120 carrying a loosely retained ball 122 suspended at the lower end therefrom so as to engage sleeve cam 105. The stem 120 is centrally bored as at 124, the ball 122 sealing the bore by means of an angular valve seat 126 when the stem is in the raised position (Fig. 3). A pin 128 secured through the valve body 42 engages a slot 130 formed in the stem's lower end and functions to limit vertical movement of the stem within the limits of desired travel. The upper end of the stem 120 forms a lifter pin 132 engageable with a ball 134, the ball separating and defining an upper chamber 136 and a lower chamber 138 by bearing on valve seat 140. The upper chamber 136 is closed by means of cap 142 which in turn bears against a spring 144 contacting the ball 134 thereby normally seating the ball 134 on valve seat 140. As best shown in Fig. 6, the upper chamber 136 communicates with the fluid pressure source by means of conduit M to a point adjacent the lower end of slide valve 78. The lower chamber 138 in turn communicates with the lower end of the selector valve piston head 52 via conduit N. Thus, in Fig. 1, it will be apparent that as pressure air enters the selector valve 40 the air will travel via conduit M, through the upper chamber 136, past the ball 134, thence via conduit N to the lower end of the selector valve piston head 52 thus raising the piston to the upper selected position.

The release valve 50, as illustrated in Figs. 1, 2, 5 and 6, comprises a valve body 150, bolted or otherwise secured to the selector valve body 42 as at 152, the body 150 being bored to receive a sleeve actuated plunger 154 engageable at one end with sleeve cam portion 108 and cam 110. The opposite end of the plunger 154 mounts a pin 156 in contact with a spring biased ball 158 normally seated on valve seat 160. When the ball 158 bears on seat 160, a vent passage 162, open to the atmosphere, is shut off from conduit P communicating with the lower end of the selector valve piston head 52. Moving the sleeve 46 in either direction will present cam surfaces 110 and 112 to cause the plunger 154 to unseat the ball 158 and vent the selector valve 40 rapidly with minimum carriage travel as reflected by small increments of sleeve movement.

*Half-nut lever operating cylinder*

Turning now to Fig. 7, the half-nut lever operating cylinder 170 mounts a novel and quick acting relief valve 172 exteriorly at one end thereof. Dependent upon carriage orientation, pressure fluid will enter either one or the opposite ends of the cylinder 170 via conduits E and F dependent upon the position of piston 44 of selector valve 40. In either event, piston 174 must be fluid tight on its forward and rearward faces presented to the operating pressure coming in. However, when it is desired to release the half-nut lever 28, the residual air behind the pressure face of the piston must be quickly released in order to stop the carriage travel, this being particularly true in high speed operations. Thus, relief valve 172 performs the dual function of quickly venting the residual air from one face of the piston 174 during movement in one direction yet seals the opposite face of the piston during movement thereof in the opposite direction.

The relief valve 172 comprises a valve actuating piston 176, reciprocable in chamber 178, one end of the chamber 178 communicating via pipe 180 with cylinder end 182 adjacent the entry for conduit F. The opposite end of the actuating piston 176 mounts a spring biased poppet valve 184 sealing valve chamber 186 which communicates via passage 188 with the opposite cylinder end 190 adjacent the entry for conduit E. Intermediate the piston and valve chambers 178 and 186, respectively, a series of radial ports 192, open to the atmosphere, connect with valve chamber 186 via poppet valve 184. Each piston and valve chamber 178 and 186 is sealed at their respective ends by suitable screw caps 178A and 186A, respectively. During release operation of the half-nut lever, pressure air enters the cylinder 170 via conduit F and starts the piston 174 moving to the left as viewed in Fig. 7 when piston 44 of selector valve 40 is in a reverse position. Pressure air also travels via pipe 180 thus forcing the actuating piston 176 to the left and opening the poppet valve 184. Residual air is now rapidly vented from cylinder end 190 via passage 188, poppet valve 184 and the radial ports 192 to achieve a quick release of the half-nut lever and minimum forward carriage travel. The half-nut lever operating piston 174, shown as moved to the left or disengaged position in Fig. 7, is illustrated as being mounted on a piston rod 194 reciprocable through sealing gland 196 on the left end of the cylinder 170. In order to prevent any premature movement or partial engagement of the half-nut lever 28 by minute leaks from the thread counter valve 37 or by incomplete engagement of the counter valve cam 284 with the dial cam lobes 36A, a longitudinal vent passage 198 is formed in the piston rod 194. The vent passage 198 is of a length sufficient to extend from the interior of the cylinder through the gland 196 to the exterior side thereof and communicates with the interior of the cylinder by lateral passage 200 at one end and with the atmosphere by exterior lateral passage 202 at the opposite end. Thus, any pressure fluid that is not up to full operating pressure will enter via conduit E, enter lateral passage 200 on the left face of the piston 174, pass through gland 196 via passage 198 and thus be vented to the atmosphere via exterior lateral passage 202. Incoming pressure fluid at the proper operating pressure entering cylinder 170 from conduit E will not be vented due to fractional movement of the piston to the right sealing the exterior lateral passage 202 rendering the vent inoperative.

Thread counter valve

Figs. 8 through 15 pertain to a detailed illustration of the dial operated thread counter valve 37 utilized in the present invention. In normal thread cutting operations on a lathe not employing the present valve 37, it was necessary for the operator to view the rotating thread counter dial 36, generally bearing indicia about its outer circumference, and at the instant of registration of one of the selected indicia with a fixed mark, the operator would manually engage the half-nut lever 28. Obviously, this method is suitable for low speed operations up to and including two threads per inch and a cutting speed of 75 revolutions per minute. However, on high speed work in the order of two threads per inch and 500 or more revolutions per minute, it is not feasible to manually engage the half-nut lever 28. The present valve 37 performs this function by being automatically and selectively positioned for engagement or disengagement with the rotating thread counter dial and further provides for needed changes in cam angle dependent upon lathe speeds.

Figs. 8, 9 and 12 illustrate the valve 37 as being secured to a lathe mounted fixed bracket 210 by means of bolts 212 passing through a support block 214. The support block 214 is slidably fitted in slot 216 formed in the valve body 218 and is retained against lateral movement by retainer plate 220. Thus, it will be apparent that valve casing or body 218 is vertically movable on support block 214 and piston 234 by the pressure in chamber 230. A second angular bracket 222, secured to the lower end of lathe bracket 210, is slotted at 224 to receive and retain a grooved lower end stem 226 of a lifter piston 228. By the spring arrangement 232, the valve body 218 is normally biased in a downward direction, whereupon cam 284 on cam housing 274 is maintained out of contact with the cams 36A on the thread counter dial 36. When casing or body 218 is moved to an operating position as heretofore set forth cam 284 is moved into engagement with cams 36A on dial 36 and spring 232 in chamber 230 is compressed between the bottom wall defining chamber 230 and head 234 in response to movement of casing 218 with respect to piston 228 thereby to insure return of the casing from an operating position to an initial position when the pressure in chamber 230 of counter valve 37 is reduced, as will be hereinafter morefully described. Suitable sealing means for the piston head 234 are provided by a circumferential groove 236 seating an annular sealing ring 238, preferably of Teflon or some similar material, combined with an interior O-ring 240 urging the ring outwardly to engage the walls of piston cylinder 230.

In order to insure positive lock-in at the upper limit of desired valve travel, an adjustable spring biased detent 242 (Fig. 10) is threadably retained in a portion of the valve housing adjacent a V-shaped groove 244 formed in the stem end of the lifter piston 228. Sufficient pressure may be brought to bear on the sealing piston 228 by detent 242 so as to cause resistance to the movement of casing 218, as the casing is moved with respect to piston 228 thus providing an adjustment whereby the body 218 may be operated in response to an increase or decrease in the operating pressure. For example, if the toolholder 23 is operable at pressures of 60 to 80 pounds per square inch and the speed of operation of the lathe is too great to permit lock-in at these available pressures, increasing the spring pressure of detent 242 somewhat may require the pressure build up to be on the order of 100 pounds per square inch.

Mounted parallel to but axially displaced from the lifter piston 228 is an elongated valve 246 bored and threaded at its lower inlet end to receive conduit D. A floating check valve 248, spring biased by spring 250 in a downward direction, is vertically movable in a valve cylinder 252. Check valve 248, cylindrical in shape, has its upper and lower ends truncated as at 248A and 249A, respectively, for seating against upper and lower valve seats 248B and 249B, respectively. The lower valve seat 249B seals off conduit D when the check valve is in the down position while the upper valve seat 248A seals pressure air from a series of lateral vents 254, free to the atmosphere, when the check valve is in the up position, i.e., with the pressure on from response valve 29'. The major portion of the check valve 248 is of smaller diameter than the valve cylinder 252 but is rendered airtight by the provision of a relatively thin, annular skirt 256, formed integrally therewith and engageable with the walls of the valve cylinder 252. The check valve 248 used in the present invention is made preferably of Teflon, this material being sufficiently pliable to allow the integral skirt 256 to pass incoming air from the response valve 29' in an upward direction but effectively sealing the cylinder walls against return reverse pressure during venting of the valve 37.

An intermediate chamber 258 communicates with the lower check valve cylinder 252 via a series of vertically aligned passages 260 (Fig. 13) and also with the lifter piston cylinder 230 via lateral passage 262. The upper portion of the intermediate chamber 258 communicates with conduit E via lateral passage 264 and is normally sealed off therefrom by means of a spring biased ball check 266 bearing against valve seat 268. The uppermost portion of the valve casing or body 218 supports a reciprocable plunger 270, the lower end of which is reduced in diameter to form a stem 272 engageable with the ball check 266 when the casing is in the aforesaid operating position to maintain the ball check out of engagement with seat 268. The spring in chamber 258 in engagement with ball check 266 is adapted to move the ball check in sealing engagement with seat 268 when the casing 218 has been moved from an operating position to an initial position, while the upper end of the plunger carries an integrally formed cam housing 274.

It will be understood that upon reverse movement of the selector valve piston 44, ram piston 27 is vented by way of vent valve 27A and concurrently therewith the pressure in valve chamber 252 is reduced by way of conduits D and K, pressure valve 29' and vent valve 27A, the pressure valve 29' being constructed and arranged to remain in the position shown in Fig. 1 until the valve chamber 252 is vented. When this occurs ram 25 is returned to an initial position by return spring 24, Fig. 1, valve 248 in chamber 252 of structure 37 is moved to a position against seat 249B by spring 250 and out of engagement with seat 248B thereby allowing pressure within chamber 230 of structure 37 to be vented by way of ports 262, chamber 258, passages 260 and 254 to atmosphere, as best shown on Fig. 12. As the pressure in chamber 230 is vented in the aforesaid manner, the valve casing 218 will be returned from an operating position, Fig. 12, to an initial position, Fig. 8, by spring 232, with cam 284 out of engagement with cams 36A and ball check 266 in sealing engagement with seat 268, the valve 266 being maintained in engagement with seat 268 by the spring in chamber 258. Referring now to Figs. 8, 9, 11 and 14, the cam housing 274, shown to be rectangular in plan form, is composed of a cam support block 276 radially grooved as at 278 and a cam retainer plate 280 secured to the support block 276 in any suitable manner, such as by bolts 282. The variable actuator cam 284 has a lower face 286 formed on a radius from its cam point 288 to matingly engage the radial groove 278 of support block 276 while the upper face is formed as a cam having an inclined face 290 rising on one side to the point 288 with fast drop in angle by vertical face 292 on the opposite side. One side 294 of the cam 284 is smooth walled while the opposite side 296 has a relatively small radial shoulder 298 which, when assembled in the cam housing, mates with a similar groove 300 formed in the retainer plate 280. From the foregoing construction, it is readily apparent that the cam 284 is free to move within the cam housing 274 in a radial manner about its point 288 but is retained against any vertical displacement by means of the radial shoulder 298 being engaged by the groove 300 in the retainer plate 280. To facilitate desired angular changes of the cam 284, an operating lever 302 is provided, the lever forming the central part of cam 284 and extending from the cam a sufficient distance beyond an indicator arc 304 carried by the retainer plate 280 to enable facility of movement by an operator. Suitable indicia 306 on the indicator arc 304 enable accurate positionings of the cam 284 by the lever 302. A lock bolt 308 (Fig. 14) is threaded into the retainer plate 280 and frictionally engages wall 296 of the cam thus locking the cam 284 at the desired angular relationship. It is desired to point out that the point 288 of cam 284 will always be in the same relative position with respect to lobes 36A formed on the thread counter dial 36 but that the inclined face 290 can be presented in earlier or later timed striking relationship with lobes 36A. For example, moving the lever 302 counterclockwise will raise the inclined face 290 to produce earlier cam reaction while moving the lever 302 in the reverse direction will ultimately present only a fraction of the surface of the cam 284 adjacent the point 288 thus producing later cam reaction. Assuming the lathe to be operating at 100 revolutions per minute and cutting two threads per inch, the lever 302 would be moved to the position shown in Fig. 8, that is, on the "20" mark. However, if the speed of lathe operation is increased to 500 revolutions per minute, the lever 302 would be moved to the "0" mark. If the cam were not made variable, it is apparent that the small surface area presented by the point 288 of the cam 284 could possibly strike a rotating thread counter cam lobe 36A for a fleeting instant with insufficient time for the flow of air pressure to cause full engagement of the half-nut, and the dial would rotate past the mark and stop rotating in late timed relationship. In other words, the half-nut lever cylinder 170 would partially engage the half-nut lever 28 in improper synchronization, i.e., engage the angular sides of the lead screw causing crossed threads or spoilage of the work.

Vertical movement of the cam housing 274 is limited by means of a stop plate 310, adjustably secured to the valve body 218 as at 312, the stop plate 310 having a slot 314 formed in the upper end thereof slidably engageable with a shoulder 316 formed on the lock bolt 308.

Fig. 16 illustrates the check valve 246 forming the lower portion of the valve 37 shown in Fig. 12 and being removed therefrom, all elements being similar to those elements afore-mentioned with the exception of a threaded insert 318 secured to the upper end of the valve and having a threaded bore 320 formed therein for receiving a conduit such as conduit K, shown in Fig. 1. The check valve 246 of Fig. 16 may be utilized throughout the system wherever it is desired to achieve rapid reduction of the residual air pressures from the various elements.

Obviously many modifications and variations of the present invention are possible in the light of the above teachings. It is therefore to be understood that within the scope of the appended claims the invention may be practiced otherwise than as specifically described.

What is claimed is:

1. In a system for automatically controlling the operation of a machine tool comprising a selector valve, a pressure responsive piston slidably arranged within said valve, a source of fluid pressure in communication with said selector valve for applying pressure to one side of the piston, a normally open control valve in communication with said selector valve for supplying pressure to the other side of said piston, movable means in engagement with said control valve for maintaining said control valve in an open position until said movable means is moved a predetermined amount, means for closing said control valve when the movable means is moved said predetermined amount, pressure responsive means in communication with said selector valve and actuated by the pressure from said one side of the piston, a slidably mounted thread counter valve in communication with said pressure responsive means and movable from an initial position to an operating position when the pressure therein has reached a predetermined value to initiate operation of said movable means, means connected to and controlled by said pressure responsive means for applying the pressure to said counter valve, a normally closed release valve in engagement with said movable means and in communication with said selector valve and actuated to an open position as said movable means is moved said predetermined amount for releasing the pressure at said other side of the piston to allow the piston to be moved from an initial position to a final position by said pressure at said one side of the piston as said control valve is closed, means, including a slide valve carried by and movable with said piston for reducing the pressure to said pressure responsive means as the piston is moved to said final position, vent means in communication with said selector valve and said pressure responsive means for venting said pressure means as pressure therein is reduced to a predetermined value, means disposed within said counter valve and actuated in response to said reduction of pressure, port means disposed within said counter valve for exhausting the pressure within said valve as said last named means is actuated, and means disposed within said counter valve for moving the counter valve from said operating position to said initial position as said pressure therein is exhausted.

2. A system according to claim 1 including a pressure responsive element in communication with and actuated in response to pressure from said counter valve for moving said movable means from an initial position to a final position, a pressure actuated device in communication with said selector valve and operated by the pressure from said source of fluid pressure when said piston is in said final position for moving said movable means from a final position to an initial position.

3. In a system for automatically controlling the operation of a machine tool comprising a selector valve, a pressure responsive piston slidably arranged within said valve, a source of fluid pressure in communication with said selector valve for applying pressure to one side of the piston, a normally open control valve in communication with said selector valve for supplying pressure to the other side of said piston, movable means in engagement with said control valve for maintaining said control valve in an open position until said movable means is moved a predetermined amount, means for closing said control valve when the movable means is moved said predetermined amount, pressure responsive means in communication with said selector valve and actuated by the pressure from said one side of the piston, a slidably mounted thread counter valve in communication with said pressure responsive means and movable from an initial position to an operating position when the pressure therein has reached a predetermined valve to initiate operation of said movable means, means connected to and controlled by said pressure responsive means for applying the pressure to said counter valve, a normally closed release valve in engagement with said movable means and in communication with said selector valve and actuated to an open position as said movable means is moved said predetermined amount for releasing the pressure at said other side of the piston to allow the piston to be moved from an initial position to a final position by said pressure at said one side of the piston as said control valve is closed, means, including a slide valve carried by and movable with said piston for reducing the pressure to said pressure responsive means as the piston is moved to said final position, vent means in communication with said selector valve and said pressure responsive means for venting said pressure means as pressure therein is reduced to a predetermined value, means disposed within said counter valve and actuated in response to said reduction of pressure, port means disposed within said counter valve for exhausting the pressure within said valve as said last named means is actuated, and means disposed within said counter valve for moving the counter valve from said operating position to said initial position as said pressure therein is exhausted, a pressure responsive element in communication with and actuated in response to the pressure from said counter valve for moving said movable means from an initial position to a final position, means including an adjustable cam carried by said counter valve engageable with complementary means on a counter dial for maintaining fluid communication between said pressure responsive element and the counter valve when the valve is in said operating position.

4. A system according to claim 1 including a ball check disposed within said counter valve for applying said pressure to said pressure responsive element when the counter valve is in said operating position, means carried by said adjustable cam in engagement with said ball check for maintaining said ball check in an open position while said counter valve is in operating position, means disposed within said valve in engagement with said ball check for closing said check when said counter valve is in an initial position.

5. A system according to claim 1 including cam means on said movable means normally in engagement with said control valve for maintaining said valve in an open condition until said movable means has moved a predetermined amount, additional cam means on said movable means in engagement with said release valve for maintaining said release valve in a closed condition until said movable means has moved a predetermined amount, means in engagement with said control valve for moving said valve to a closed position when said movable means has moved a predetermined amount, additional means on said movable means for moving said release valve to an open position when said movable means has been moved said predetermined amount.

6. The system as set forth in claim 1 wherein said thread counter valve comprises a housing, a plunger reciprocable in said housing and in engagement at one end thereof with said ball check, a variable angle cam mounted on the opposite end of the plunger and movable therewith, rotatable means engageable with the variable cam for moving said plunger an amount sufficiently to maintain said ball check in an open position when the counter valve is in said operating position such that said pressure is supplied to said pressure responsive element.

7. In a system for automatically controlling the operation of a machine tool comprising a selector valve having a piston slidably arranged therein, a source of fluid pressure for applying pressure to one side of said piston, normally open means for supplying pressure to the other side of said piston, movable means in engagement with said normally open means for maintaining the normally open means open until said movable means is moved a predetermined amount, means for closing said normally open means when the movable means is moved said predetermined amount, means actuated in response to the pressure from said one side of the piston, a valve device controlled by the pressure from said pressure responsive device and movable thereby from an initial position to an operating position, means controlled by said pressure responsive means for applying the pressure to said valve device, normally closed means controlled by the movement of said movable means for releasing said pressure at said other side of the piston to cause movement of the piston from an initial position to a final position by the pressure at said one side thereof as said normally open means is closed, means controlled by the piston for reducing the pressure to said pressure responsive means when the piston is in said final position, means for venting said pressure responsive means when the pressure thereto is reduced to a predetermined value, means including a valve disposed within said valve device and actuated in response to said reduction of pressure for venting said pressure within the valve device, and means for moving said valve device from an operating position to an initial position as said valve device is vented.

References Cited in the file of this patent

UNITED STATES PATENTS

| | | |
|---|---|---|
| 1,367,459 | Carson | Feb. 1, 1921 |
| 1,902,657 | Merwin | Mar. 21, 1933 |
| 2,581,060 | Wold | Jan. 1, 1952 |
| 2,590,769 | Herrstrum | Mar. 25, 1952 |
| 2,607,197 | Johnson | Aug. 19, 1952 |
| 2,645,242 | Monnich | July 14, 1953 |
| 2,735,327 | Ritter | Feb. 21, 1956 |
| 2,791,885 | Sassen | May 14, 1957 |